United States Patent [19]

Ayache

[11] Patent Number: 4,561,734

[45] Date of Patent: Dec. 31, 1985

[54] EYEGLASS FRAME

[76] Inventor: Charles Ayache, 5, Square du Trocadéro, 75116 Paris, France

[21] Appl. No.: 381,393

[22] Filed: May 24, 1982

[30] Foreign Application Priority Data

May 29, 1981 [FR] France ................................ 81 10686

[51] Int. Cl.⁴ ............................ G02C 1/04; G02C 5/00
[52] U.S. Cl. ................................... 351/103; 351/106; 351/154
[58] Field of Search ........................ 351/106, 103, 154

[56] References Cited

U.S. PATENT DOCUMENTS 1,358,200  11/1920  Hansen .

FOREIGN PATENT DOCUMENTS 478092  2/1953  Italy ...................................... 351/106
755746  8/1956  United Kingdom ................ 351/106

Primary Examiner—Rodney B. Bovernick
Attorney, Agent, or Firm—Charles E. Brown; Charles A. Brown

[57] ABSTRACT

An eyeglass or spectacle frame comprises rims formed by threadlike flexible tie members. A bridge member is carried by and interconnects adjacent portions of the tie members. A connecting and tightening temple member tightens each tie members when the lenses are received in the rims, whereupon the lenses bear firmly against the bridge member and the temple members. An adaptor may be inserted between the temple members and the adjacent edge portions of the lenses for accommodating lenses of lesser thickness.

17 Claims, 7 Drawing Figures

U.S. Patent  Dec. 31, 1985  4,561,734
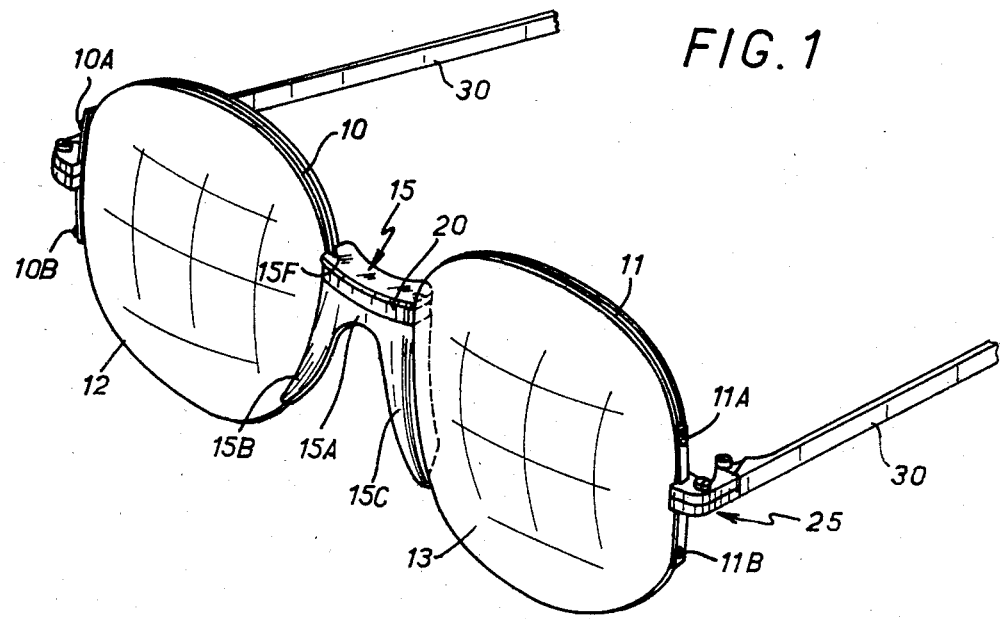
FIG. 1
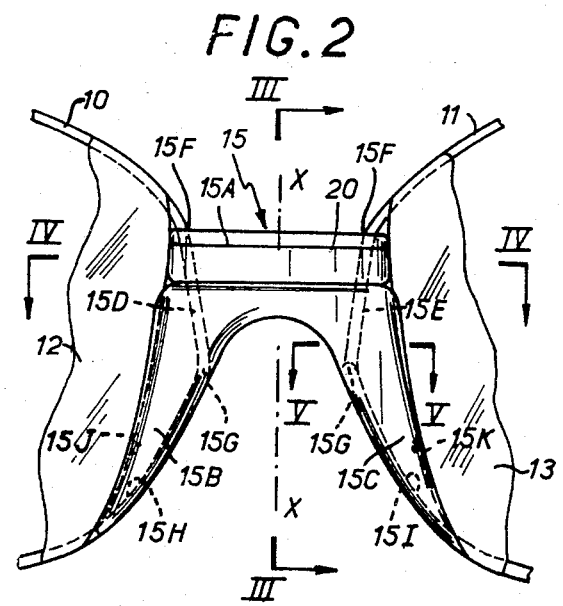
FIG. 2
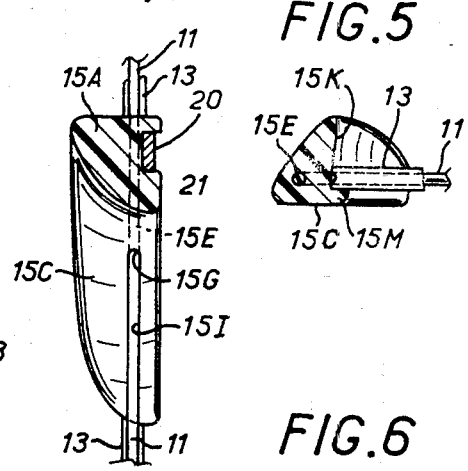
FIG. 3
FIG. 5
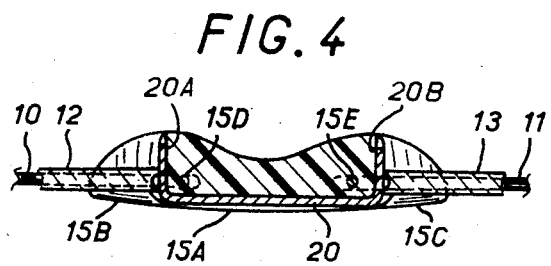
FIG. 4
FIG. 7
FIG. 6
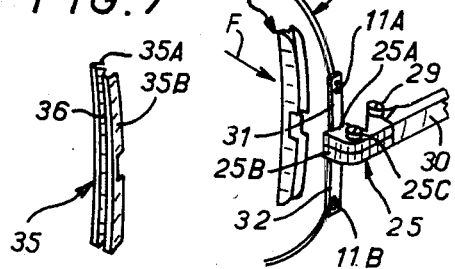

4,561,734

EYEGLASS FRAME

BACKGROUND OF THE INVENTION

The present invention relates generally to eyeglass or spectacle frames of the type in which flexible tie members are used to hold the lenses in place on the frame.

Prior art frames may be divided into at least two categories: in a first catagory the rims are opened at their temple sides where they are connected together, such rims most often being of metal construction and shaped to accommodate the lenses; and in the second category, flexible threadlike ties attached to a rigid main frame structure are used to hold the lenses in place.

The present invention relates more particularly to this second category of frames wherein the rims are formed in part of flexible tie members.

Such frames are disclosed in British Pat. No. 775,293 in which each of the lenses is held in place on the main frame structure by means of a flexible tie anchored at its ends on the main frame structure.

The use of such flexible ties for holding the lenses in an eyeglass frame has required the selection of relatively rigid materials for the construction of the main frame structure, failing which by mere deformation of the overall frame structure the lenses may accidentally fall out of their respective rims. Heretofore the use of flexible ties to secure the lenses in place has meant that the provision of a main frame structure which may consist of a main cross bar but in any event is adapted to receive part of the peripheries of the lenses in order to properly secure them and to tighten the flexible ties around the rest of the peripheries of the lenses, and in addition to provide a support for the nosepieces.

Consequently, known frames of the second category though not heavy are of not insubstantial weight and require impractical arrangements for securing the ties and for receiving the peripheral parts of the lenses. Further, the presence of a main frame structure necessarily increases the cost of the resulting frame. Finally, the aesthetics of such a frame is marked by the presence of the main frame structure which often comprises relatively massive upper parts of both rims.

OBJECT AND SUMMARY OF THE INVENTION

An object of the invention is to provide an eyeglass frame of the foregoing type which not only substantially reduces the weight of the overall frame compared with prior art frames but also substantially reduces production costs. Further, a related object is to provide a frame which is inconspicuous as possible.

In accordance with the invention there is provided a frame comprising rims for receiving lenses which are comprised at least in part of flexible tie members adapted to conform to the contour of the respective lenses. A bridge member extends between adjacent portions of the respective rims. Temple members are disposed remote from bridge members. Each of the tie members is attached to the bridge member and one of the temple members and extends along the major part of the periphery of the associated lens for holding the same. Means for tightening each of the tie members is provided on an associated one of said members for urging the bridge member and the temple members to bear firmly against the lenses so that the bridge member, the lenses and the temple members are held in a stable stationary position relative to each other when the tie members are tightened.

According to another aspect of the invention the rims are comprised at least in part of threadlike flexible members and the bridge member is carried by and interconnects the tie members, whereby the bridge member bears firmly against the lenses when the tie members are tightened.

According to a third aspect of the invention each of the rims is formed at least in part by a single flexible tie member in which the edges of the lenses are adapted to be fitted. The rims are interconnected only by a bridge member extending between adjacent parts of the rims whereby upon tightening each of the tie members the bridge member is firmly secured relative to the lenses.

According to a preferred embodiment the bridge member is relatively movably mounted on the tie members before tightening the latter. Also, the tie members are preferably of open contour with their ends attached to a connecting and tightening temple member including the means for tightening the associated tie member.

According to a preferred embodiment the bridge member is of one-piece construction with a passageway for each of the tie members to one side of the plane of symmetry of the bridge member. Preferably, the passageways open onto the top edge of the bridge member and into depending nosepieces integrally formed with the bridge member. Also, grooves may be provided in the nosepieces in continuation with the respective passageways for accommodating and guiding the tie members. Preferably, there are changes in direction in the tie member pathways between the passageways and their grooves for fixing the position of the tie members relative to the bridge member when the tie members are tightened.

It will be readily appreciated that the present eyeglass frame essentially comprises two flexible tie members and a bridge member. Accordingly, the tie members which are usually accommodated in the peripheral grooves in the lenses are therefore practically invisible. Second of all, the resulting eyeglass frame is exceptionally light in weight but is nonetheless very efficient for holding the lenses in association with the bridge member. Moreover, the rims may accommodate a variety of lens contours.

These and other features and advantages of the invention will be brought out in the description which follows, given by way of example, with reference to the accompanying drawings.

BRIEF DESCRIPTION OF THE DRAWINGS

FIG. 1 is a perspective view of a pair of eyeglasses or spectacles having a frame in accordance with the invention;

FIG. 2 is an enlarged fragmentary front-elevational view of the frame showing the bridge member;

FIG. 3 is a sectional view taken on line III—III in FIG. 2;

FIG. 4 is a sectional view taken on line IV—IV in FIG. 2;

FIG. 5 is a sectional view taken on line V—V in FIG. 2;

FIG. 6 illustrates an accessory in perspective view; and

FIG. 7 is a view taken in the direction of the arrow F in FIG. 6.

DESCRIPTION OF THE PREFERRED EMBODIMENT

The preferred embodiment of the invention depicted in FIGS. 1-7 of the drawings comprises an eyeglass or spectacle frame having two threadlike flexible tie members 10 and 11 defining the rims of the frame. The flexible tie members 10 and 11 are 'open' in the temple areas, and they are interconnected solely by the bridge member 15.

The bridge member 15 is advantageously of one-piece molded plastic construction and to both sides of a plane of symmetry X—X comprises an upper or brow zone 15A from which depends two diverging nosepieces 15B and 15C, one to each side of the plane of symmetry X—X.

To each side of the plane of symmetry X—X the bridge member 15 comprises a passageway 15D, 15E. Each of the passageways 15D, 15E has an aperture 15F which opens onto the top edge of the upper or brow zone 15A of the bridge member 15 in the immediate vicinity of the edge of the corresponding lens 12, 13, and an aperture 15G at the start of each of the corresponding diverging nosepieces 15B and 15C.

The diverging nosepieces 15B and 15C each have along their surfaces adapted to bear against the wearer's nose grooves 15H, 15I which accommodate and guide the adjacent portions of the respective tie members 10 and 11 inwardly of their surfaces in contact with the wearer's nose.

Further, these grooves 15H, 15I guide the tie members 10, 11 through the corresponding sections of the bridge member 15. Accordingly the bridge member 15 interconnects the tie members 10 and 11 in the region from the upper apertures 15F which open onto the top edge of the upper or brow zone 15A to the lower ends of the guides 15H, 15I in the nosepieces 15B, 15C.

It is noted that at the apertures 15G at the lower ends of the passageways 15D, 15E there are defined between the associated pairs of passageways 15D, 15E and grooves 15H, 15I changes in direction of the tie member pathways defined by obtuse angles which in the course of tightening the threadlike tie members 10, 11 fix the position of the tie members on the bridge member 15 thereby preventing any relative displacement.

Since the upper apertures 15F of the passageways 15D, 15E opening in the immediate vicinity of the upper part of the lateral sides 15J, 15K of the bridge member 15, the bridge member is preferably provided with a reinforcement member 20 in the upper or brow zone 15A thereof. The reinforcement member 20 is made of metal and is of generally U-shaped configuration. The intermediate portion of the reinforcement member 20 lies along the front of the brow zone of bridge member 15 and its legs 20A, 20B lie along the lateral sides thereof. Preferably, the reinforcement member is received in a groove 21´of corresponding section formed for this purpose in the upper or brow zone 15A of the bridge member 15.

Moreover, the lateral sides 15J,15K of the bridge member 15, at least along the depending nosepieces 15B, 15C are adapted to define peripheral bearing surfaces for the lenses 12, 13.

As best shown in FIGS. 1 and 6, the rims defined by the tie members 10 and 11 are open in the temple area. The free ends 10A, 10B; 11A, 11B of the respective tie members 10 and 11 are anchored by a connecting and tightening temple member generally designated by reference 25 which permit the ends of the tie members 10 and 11 to be connected relative to the respective hinge members for the temple pieces 30. Each connecting and tightening temple member 25 comprises a yoke having resiliently deformable arms 25A, 25B which may be moved together or apart by tightening or loosening a screw 25C and a knuckle adapted to receive a hinge pin 29 for a temple piece 30 as is well known in the art.

In the illustrated embodiment the free ends 10A, 10B; 11A, 11B of the tie members 10, 11 are anchored on the temple members 25 by anchor sections 31, 32 adapted to be fitted into a portion of the grooved edges of the respective lenses.

Before the lenses 12, 13 are mounted in the frame embodying the invention, the tie members 10, 11 are slack and connected loosely together by the bridge member 15 and the temple members 25 at the temple sides of the tie members 10, 11 are in their standby position, that is, with the screws 25C loosened and the arms 25A, 25B spaced apart.

After fitting the lenses in the respective rims by laying the threadlike tie members 10, 11 in the peripheral grooves of the lenses, the screws 25C are tightened so that the tie members 10, 11 are taut around their respective lenses. The tightening of the tie members 10, 11 around the lenses fixes the tie members relative to the bridge member 15 by means of the obtuse angles in the tie member pathways formed at the apertures 15G at the intersection of the passageways 15D, 15E and the grooves 15H, 15I. Furthermore, the tightening of the tie members 10, 11 rigidify the entire assembly and hold the lenses in a stable, stationary position. Owing to the tightening of the tie members 10, 11 the corresponding adjacent peripheral edge portions of the lenses 12, 13 bear firmly against practically the entire height of the lateral sides 15J, 15K of the bridge member 15 whereas the diametrically opposite peripheral edge portions of the lenses 12, 13 are received in the profiled anchor sections 31, 32 whereby the lenses are firmly held in place relative to the bridge member 15 and the temple members 25.

On account of the flexibility of the tie members 10, 11 they can embrace the lenses without any long and meticulous fitting. Only the length of the tie members has to be taken into consideration as a function of the perimeter of the lenses. Moreover, the tie members may accommodate lenses of different contours.

It will be noted, therefore, that eyeglasses according to the invention will be lighter than present-day eyeglasses, and the very inconspicuous owing to the fact that the rims are practically invisible and the bridge member may be made of virtually any kind of material.

The simplicity of the construction of the eyeglass frames of the present invention will be appreciated as well as the convenience of use. Indeed, with a single type of bridge member and a single type of tie member, cut to the right length, and a single type of temple member, a frame results which is perfectly well adapted to the periphery and contour of the lenses.

In this regard if the lenses are thinner than the anchor sections 31, 32 which are part of the temple members 25, adaptors such as the one shown at 35 may be provided (see FIGS. 6 and 7) and fitted into the anchor members 31, 32. Each adaptor 35 may comprise a V-shaped groove for receiving the corresponding edge portions of the lenses 12, 13.

It will be noted that each adaptor 35 advantageously comprises on its surface cooperable with the temple member 25 two convergent bent-over portions 35A, 35B in each of which is formed a middle notch 35C. Such an adaptor 35 may therefore engage the associated connecting and tightening temple member 25 in case the thickness of the lenses does not permit the fitting of the anchor sections 31, 32 in the grooves of the lenses.

Obviously the invention is not limited to the illustrated embodiment but admits of various modifications and alternatives understood to those skilled in the art without departing from the scope of the present invention.

What I claim is:

1. An eyeglass frame comprising rims for receiving lenses, said rims comprising flexible tie members adapted to conform to the contour of the respective lenses, a bridge member extending between adjacent portions of the respective rims, temple members in the temple zones remote from said bridge member, each of said flexible tie members being attached to said bridge member and one of said temple members and extending along the major part of the periphery of associated lens for holding same, means for tensioning each of said tie members being provided on an associated one of said bridge and temple members for urging said bridge member and said temple members to bear firmly against the lenses, whereby said bridge member, the lenses and said temple members are held in a stable, stationary position relative to one another when said tie members are tightened.

2. An eyeglass frame comprising rims for receiving lenses comprised at least in part of threadlike flexible tie members, means for tensioning said tie member when the lenses are in position in said rims, a bridge member extending between adjacent portions of the respective tie members, said bridge member being carried by and interconnecting said tie members, whereby upon tightening said tie members said bridge member bears firmly against said lenses to define a fixed and stable position of said bridge member and the lenses.

3. The eyeglass frame according to claim 1, wherein said bridge member is relatively movably mounted on said tie members before tensioning the latter.

4. The eyeglass frame of claim 2, wherein said tie members are attached to said temple members for supporting temple pieces, said temple members bearing firmly against the respective lenses when said tie members are tightened.

5. The eyeglass frame of claim 1, wherein said tie members are of threadlike configuration for mating with the grooved peripheral edges of the lenses.

6. The eyeglass frame of claim 2, said flexible tie members having open contours, wherein each of the ends of each of said tie members are attached to a respective temple member including said means for tensioning the associated tie member.

7. The eyeglass frame of claim 1, wherein said tie members comprise pathways through said bridge member.

8. The eyeglass frame of claim 1, wherein said bridge member is of onepiece construction, and comprises to each side of a plane of symmetry a passageway for each of said tie members.

9. The eyeglass frame of claim 8, wherein said passageways open onto the upper part of said bridge member and into depending nosepieces integrally formed with said bridge member.

10. The eyeglass frame of claim 9, wherein said nosepieces comprise grooves in continuation with the respective passageways in said bridge member, said grooves accommodating and guiding the respective tie members.

11. The eyeglass frame of claim 1, wherein said bridge member has suitably configured lateral sides running along substantially the entire height thereof for bearing firmly against adjacent edges of the associated lenses.

12. The eyeglass frame of claim 9, wherein said passageways open onto said upper part of said bridge member in the immediate vicinity of the edges of associated lenses.

13. The eyeglass frame of claim 1, wherein bridge member is of one-piece molded plastic construction and comprises a U-shaped reinforcement member received in a groove formed in the front and the sides of the upper part of said bridge member.

14. The eyeglass frame of claim 1, wherein said tie members are of open contour and the ends of the respective tie members are attached to respective anchor sections associated with said means for tensioning said tie members.

15. The eyeglass frame of claim 10, wherein said passageways and said grooves in continuation therewith define obtuse changes in direction of the tie member pathways for fixing the position of said tie members relative to said bridge member when said tie members are tightened.

16. The eyeglass frame of claim 14, wherein adaptors are insertable between said anchor sections and their associated lenses for accommodating in said frame lenses of lesser thickness.

17. The eyeglass frame of claim 1, wherein each of said temple members comprises a pair of anchor sections to which the respective ends of the associated tie member are attached, each of said anchor sections being fixed to an arm, and a fastener means cooperating with the arms of each of said temple members for moving the arms together and thereby tensioning the associated tie member.

* * * * *